United States Patent [19]

Linden et al.

[11] Patent Number: 5,301,213
[45] Date of Patent: Apr. 5, 1994

[54] METHOD OF FIELD REPLACEMENT OF AN ELECTRICAL CONNECTOR FOR NUCLEAR REACTOR INSTRUMENTATION

[75] Inventors: Michael J. Linden, Wethersfield; Brian D. Williamson, West Hartford, both of Conn.

[73] Assignee: Combustion Engineering, Inc., Windsor, Conn.

[21] Appl. No.: 74,125

[22] Filed: Jun. 8, 1993

[51] Int. Cl.⁵ ............................................. G21C 19/00
[52] U.S. Cl. ........................... 376/260; 376/203; 29/402.08; 29/447; 403/273; 439/161; 285/381
[58] Field of Search .................... 376/260, 203; 29/402.08, 426.4, 447; 403/28, 273, 292, 293, 297, 300; 439/152, 153, 161, 877; 285/381, 909

[56] References Cited

U.S. PATENT DOCUMENTS 4,352,542 10/1982 Tydings ............................. 403/273
5,058,936 10/1991 Kapgan et al. ....................... 29/447

Primary Examiner—Daniel D. Wasil
Attorney, Agent, or Firm—L. James Ristas; John H. Mulholland

[57] ABSTRACT

The method of repairing in situ a damaged or malfunctioning electrical connector (10) of a safety related nuclear reactor instrument (14) and its associated sheathed cable (18) wherein the damaged or malfunctioning connector portion (20) is cut from its associated cable (18) and replaced by a new connector portion. The wires of the cut cable are connected with the replacement connector portion and are suitably insulated. The cut cable and new connector portion are then secured together by a special alloy coupling (34) which is positioned in spanning relation with the cut cable (18) and the replacement connector portion (20). This special alloy has the property that it can be expanded within limits and upon being heated above a critical temperature will return to its original dimension. The tubular coupling accordingly has an expanded diameter slightly larger than that of the replacement connector portion and the sheath of the cut cable but an original inner diameter slightly smaller. When positioned in its spanning relation with these members it is heated above its critical temperature such that it shrinks to its original shape and securely grips these members. This special alloy coupling has both circumferential and axial ridges or barbs extending inward of its inner surface to engage each of the members extending thereinto when it is shrunk into place in order to enhance the sealing and torque resistance capability of the connection.

5 Claims, 2 Drawing Sheets

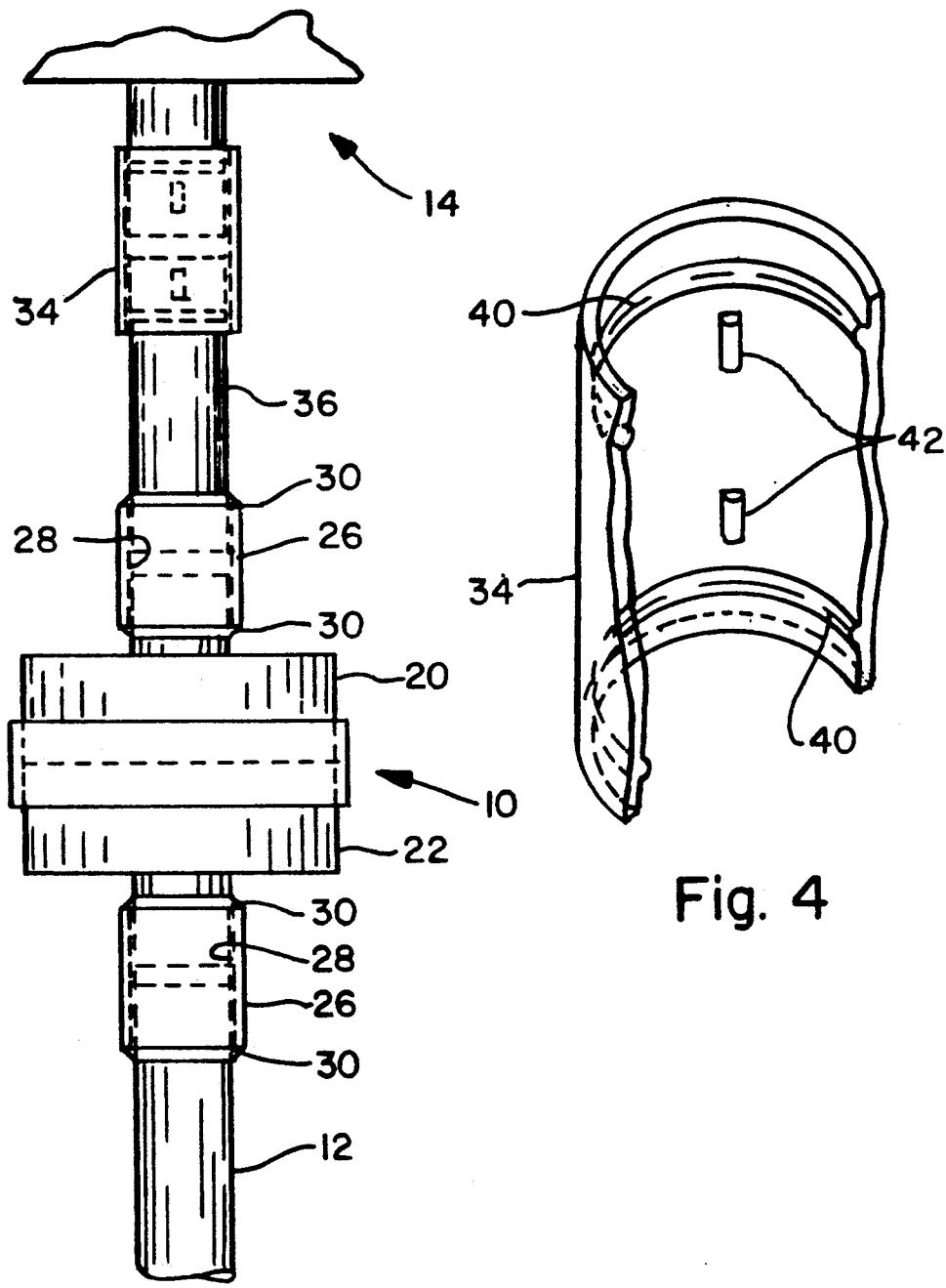

METHOD OF FIELD REPLACEMENT OF AN ELECTRICAL CONNECTOR FOR NUCLEAR REACTOR INSTRUMENTATION

BACKGROUND OF THE INVENTION

This invention relates to electrical connectors used in nuclear power plants in the electric utility industry to electrically connect safety related reactor instrumentation with its associated mineral insulated sheathed cables. These electrical connectors are made up of a male and female portion which when connected together form a hermetic seal and electrically connect together numerous electric wire conductors. It is the normal practice to have these male and female electrical connector portions permanently attached by welding to the reactor instrumentation and the associated mineral insulated cable in the manufacture's factory at the time of initial manufacture. The purpose of the weld is to provide a hermetic seal to preclude ingress of moisture during normal operation and of containment spray during a loss of cooling accident and to provide structural support to maintain integrity of the cable and the connector during connection and torquing of the connector and also during seismic events. The electrical connectors are normally attached to the reactor instrumentation and the mineral insulated cables by using a component known as a backshell. This connector backshell is a hollow cylindrical component which is welded or threaded to the connector on one end and is welded to the instrument sheath or the sheath of the mineral insulated cable on the other end. Each of the male and female portions of the electrical connector have a cylindrical back end portion which is received within this cylindrical backshell.

Problems have been encountered in the field with these connectors typical of which problems are the breaking off of the connector from the reactor instrumentation or from the mineral insulated cable, electrical shorts or opens, bent or pushed in pins and cracked insulators.

The current options available to electric utilities experiencing these problems are to (1) scrap the instrument and/or cable and purchase new ones, (2) return the instrument and/or cable to the manufacturer for repair, or (3) have the manufacturer perform repair or replacement of connectors in the field using in-containment welding or brazing. Scrapping of the instruments and/or cables generates both high level and low level radioactive waste, and the purchase of new equipment is an unplanned expense for the utility. Returning the equipment to the manufacturer is not always feasible due to radioactive contamination. Because of the radioactive environment in which these connectors are used inside the containment structure of the nuclear reactor power plant and because of the equipment and time required, welding or brazing inside this containment is an expensive undertaking in terms of both monetary cost and radiation exposure to those performing the work. Accordingly none of these options are particularly attractive.

SUMMARY OF THE INVENTION

It is an object of the present invention to provide an improved method for the field replacement of electrical connectors on safety related nuclear reactor instrumentation and associated mineral insulated sheathed cables which method is expeditious and requires no field welding or brazing. In accordance with the invention the damaged or malfunctioning connector portion is removed by being cutoff from the sheathed cable to which it is attached. A new replacement connector portion is provided and the necessary electrical connections with the sheathed cable are made and suitably insulated. The newly supplied connector portion is secured to the sheathed cable by means of a shape memory alloy coupling. This coupling is in the form of a cylindrical sleeve having an original inner diameter slightly less than that of the cut sheathed cable and the replacement connector. As supplied, this coupling has been expanded within its critical limit to a diameter greater than that of the cable and replacement connector such that they may be received therewithin. After making the aforementioned electrical connections and insulating the same the coupling is positioned to span the cable and the replacement connector such that each is received therewithin extending into the connector from opposite ends. The coupling is then heated so that the material passes through its critical temperature and returns to its original shape firmly connecting together the sheathed cable and the replacement connector. The coupling has extending inward from its inner surface a circumferential ridge or barb and an axially oriented ridge or barb in engagement with each of the members extending thereinto from its opposite ends to improve sealing capability and torque resistance.

BRIEF DESCRIPTION OF THE DRAWINGS

FIG. 3 is a view similar to that of Figure wherein a slightly modified field replacement technique has been utilized.

FIG. 4 is an enlarged diagrammatic representation of the shape memory alloy coupling utilized with the method of the invention with the coupling being longitudinally broken away in this representation so as to show the interior ridges or barbs found on the interior surface of the coupling.

DESCRIPTION OF THE PREFERRED EMBODIMENTS

Figure 1:
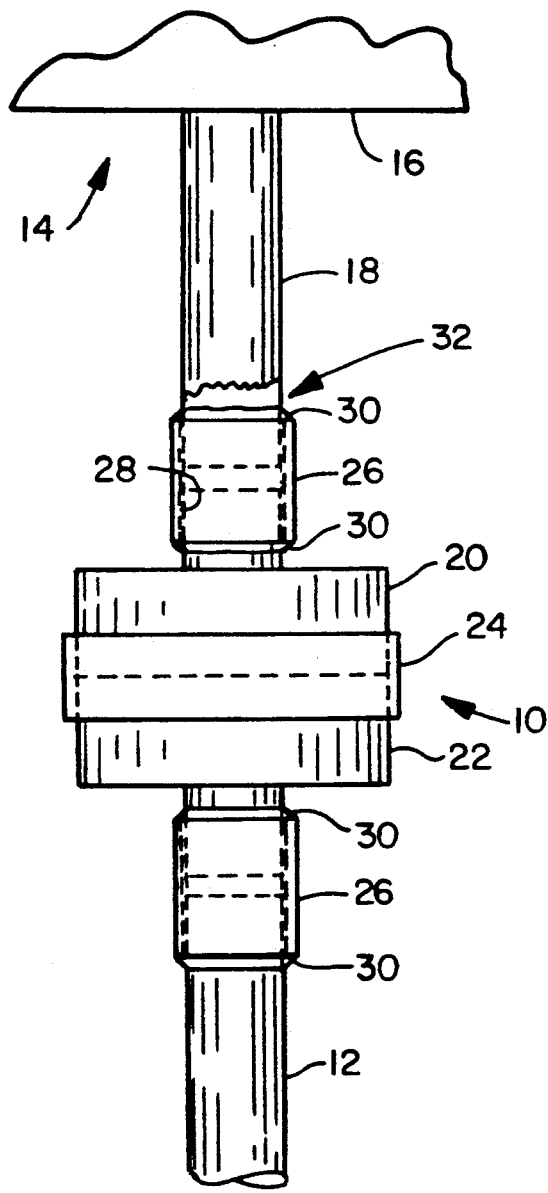
FIG. 1 is a diagrammatic representation of an electrical connector as used with safety related nuclear reactor instrumentation and associated mineral insulated sheathed cables.

Referring to the drawings FIG. 1 diagrammatically depicts an electrical connector 10 interconnecting the numerous wires of a mineral insulated metallic sheathed cable 12 with a safety related nuclear reactor instrument 14 which includes the instrument proper 16 and the metallic sheathed connector 18 which while being an integral part of the reactor instrument is in essence a sheathed cable that is connected with the electrical connector 10. Electrical connectors provide a disconnectable connection between numerous electrical conductors and in the representation of FIG. 1 the connector 10 provides such a disconnectable connection between the numerous electrical wires of the cable 12 and a sheathed instrument connector 18. These electrical connectors are typically made up of a male portion and a female portion removably secured together by a suitable mechanism. In FIG. 1 the male portion is designated 20 and the female portion designated 2 with these connector portions being secured in operative and hermetically sealed relation by means of the collar 24 which is threaded onto one of the connector portions and has an inwardly directed shoulder which engages a mating shoulder on the other connecting portion so that as the collar is threaded onto the threaded connection portion the male and female portions of the connector are firmly secured together.

As previously mentioned these electrical connectors as employed with these safety related nuclear reactor instruments within the containment facility of the nuclear reactor may become damaged or malfunction so that repair is required.

In accordance with the improved method of the present invention this repair is made in situ by replacing one or both portions of the electrical connector and with the repair being made by utilization of a shape memory alloy coupling. Shape memory alloys are a unique family of metals which have the ability to change and return to their original shape depending upon their temperature. These alloys may be deformed within a critical limit, typically a 5 to 7% deformation, and upon heating beyond a critical temperature will return to their original shape. Accordingly a tubular shaped coupling may be fashioned from such an alloy and may be shrunk onto a cylindrical member. This may be accomplished by fashioning the alloy coupling with an original diameter slightly less than the cylindrical member, then deforming, i.e., expanding the coupling to a diameter slightly larger than that of the cylindrical member, slipping the coupling over the cylindrical member and then heating the coupling beyond the critical temperature of the shape memory alloy so that it returns to its original configuration providing an interference fit and securely securing together the coupling and the cylindrical member.

The electrical connectors to which the invention pertains are normally permanently attached by welding at the factory with the connectors being secured to the metallic sheathed cables by means of a hollow cylindrical component called a backshell. As depicted the backshells 26, which are hollow cylindrical members receive therewithin the cylindrical back end portions 28 of the male and the female portions 20 and 22 of the electrical connector and also receive the metallic sheathed cable members 12 and 18 with these backshells being welded at 30 to these members extending thereinto to provide a rigid fluid tight connection.

Figure 2:
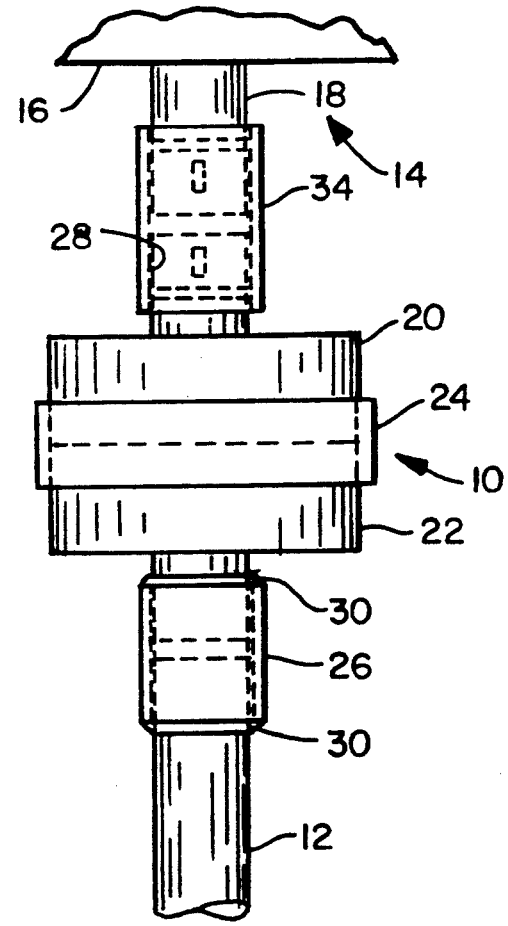
FIG. 2 is a similar diagrammatic representation after field replacement of a portion of the electrical connector has taken place in accordance with the invention.

In accordance with the present invention a field replacement of a damaged or malfunctioning electrical connector portion is made by utilizing a shape memory alloy coupling to secure in place a new replacement connector portion with the defective or malfunctioning connector portion having been removed by being cut from the sheathed cable to which it was attached. Thus in FIG. 1 assuming that there is a break at the location 32 the male portion 20 of connector 10 is removed by cutting the sheathed cable connector 18. A shape memory alloy coupling is manufactured with an original inner diameter slightly less than that of the sheathed cable connector 18 and the cylindrical back end portion 28. This alloy coupling is then expanded within its critical limit to a diameter greater than that of the sheathed cable connector 18 and the back end portion 28. This coupling identified as 34 in FIG. 2 is then slipped over the sheathed cable connector 18. A new male portion 20 is positioned in place and the wires of sheathed cable connector 18 connected with this male portion 20 and then suitably insulated. The alloy coupling 34 is then slipped down into place so that it spans the sheathed cable connector 18 and the back end portion 28 of male connector portion 20 with these members extending well within the confines of coupling 34. The coupling is then heated by any suitable means, such as a heat gun, to a temperature above its critical temperature so that it returns to its original diameter and firmly grips the cylindrical members extending thereinto providing a very strong connection. After thus replacing the male portion 20 the connector 10 may be put back together with the male portion 20 and female portion 22 being secured together by means of the collar 24.

While replacement of the male portion 20 of the connector 10 has been described it will be understood that the female portion 22 may be replaced in the same manner using the same steps and of course both portions of the electrical connector 10 may be replaced if such is necessary.

In lieu of having the shape memory alloy coupling interconnect the sheathed cable and the cylindrical back end portion of the electrical connector the new replacement portion or portions of the electrical connector 10 may be provided with, i.e., manufactured with, a short cable portion which can in turn be rigidly connected with the cut sheathed cable by means of a shape memory alloy coupling. Such a modified arrangement is depicted in FIG. 3 where, again assuming that the break is at 32 in the FIG. 1 illustration and cable 18 is cut and the male portion 20 of electrical connector 10 is removed and discarded. A new male connector portion 20 is provided with this connector portion 20 having a short sheathed cable 36 electrically connected therewith and secured in place by means of the welded backshell 26. A shape memory alloy coupling 34 is provided which, as aforementioned, has an expanded diameter slightly greater than that of the sheathed cable connector 18 and the short sheathed cable 36. This coupling 34 may advantageously be slipped over the cable portion 36 and the replacement supplied to the reactor site in this fashion. After removal of the damaged or malfunctioning electrical connector portion this replacement connector may be positioned in place and the wires in the short sheathed cable 36 and the sheathed cable 18 suitably connected together and appropriately insulated. The alloy coupling 34 may then be slipped up into place so it spans connector cable 18 and cable 36 and so these members extend well within the coupling 34 from each end thereof. Thereafter the coupling is heated to a temperature above its critical so that it returns to its original diameter which is slightly less than that of connector cable 18 and cable 36 to thereby firmly grip these members that extend thereinto. The electrical connector 10 may then be reassembled as previously described.

In order that the shape memory alloy coupling as shrunk on in accordance with the invention will have the necessary sealing capability and torque resistance it is essential that the inner cylindrical surface of the coupling be provided with circumferential and axially oriented ridges or barbs. These are depicted in FIG. 4 with the circumferential ridges 40 being effective to give a hermetically sealed connection and with the axial ridges 42 providing the torque resistance necessary to a proper functioning of the replacement electrical connector. The positioning of the ridges 40 and 42 is such that they will engage the sheathed cable portions that extend into the coupling from the opposite ends thereof.

While the metallic sheathed cables are considered to have sufficient strength so that the shaped memory alloy coupling can be secured directly thereto as previously described herein if it is desired to provide additional strength and accordingly greater assurance against crushing of the metallic sheathed cable a sleeve may be secured to the cable prior to shrinking the coupling thereon. This sleeve may itself be a shaped memory alloy having a smooth inner surface and a length substantially greater than the distance that the aforementioned alloy coupling overlaps the sheathed cable. This greater length and smooth surface will be effective to distribute the interference forces sufficiently to preclude crushing of the sheathed cable.

The term sheathed cable as used herein refers to and includes both metallic sheathed mineral insulated cables 12 and 38 as well as the metallic sheathed cable portions 18 that form a part of the nuclear reactor instrumentation.

With the method of the present invention, broken or malfunctioning electrical connectors employed within the containment structure of nuclear reactor power plants in the safety related reactor instrumentation of such plants may be repaired expeditiously in situ without the necessity of welding or brazing.

We claim:

1. The method of repairing a damaged or malfunctioning electrical connector of a safety related nuclear reactor instrument and its associated sheathed mineral insulated cable in place in the radioactive reactor environment comprising cutting the sheathed cable to the damaged or malfunctioning connector portion and removing said connector portion, providing a new replacement connector portion, wiring the replacement connector portion and the cut sheathed cable as required and insulating the same, securing said connector portion to said cut sheathed cable by means of a shape memory alloy tubular coupling, said coupling having an original inner diameter slightly less than said cut sheathed cable and said replacement connector but having been expanded within the critical limit of the material to a diameter greater than said cable and said replacement connector while at a temperature below its critical temperature, positioning said expanded coupling so that said cable and replacement connector are received within and extending into the coupling from opposite ends, heating said coupling so that the material thereof passes through its critical temperature and returns to its original shape and accordingly to a diameter slightly less than that of said cut sheathed cable and said replacement connector thus securely gripping the same, said coupling having extending inward from its inner surface a circumferential ridge or barb and an axially oriented ridge or barb in engagement with each of the members it is securing together.

2. The method of claim 1 wherein the replacement connector portion has a cylindrical back end portion and the shape memory alloy coupling is effective to connect this back end portion with the sheathed cable, said alloy coupling first being slipped onto the cut sheathed cable after which the wires are connected to the replacement connector portion and the insulation installed, said alloy coupling then being slipped over the wire connections and over said cylindrical back end portion spanning said back end portion and said sheathed cable after which it is heated above its critical temperature.

3. The method of claim 1 wherein the replacement connector portion has a short length of sheathed cable extending therefrom, the shape memory alloy connector as expanded is slipped over one of the sheathed cables, the wires of the cables are connected and insulated, said connector is then moved over said wire connections and spans said cables after which it is heated above its critical temperature.

4. The method of claim 3 wherein the shape memory alloy is slipped over the short length of cable forming part of the replacement portion prior to connecting the wires of the sheathed cables.

5. The method of claim 1 wherein prior to attaching the cut sheathed cable to the replacement connector portion the sheath of the cable is reinforced by a shape memory alloy sleeve having a smooth interior surface, said sleeve being firmly shrunk onto the end of the sheathed cable and having an axial dimension substantially greater than the axial overlap of the shape memory alloy coupling and the sheathed cable.

* * * * *